United States Patent Office.

N. T. P. ROBERTSON AND THOMAS NILES, OF FAIRBURY, ILLINOIS.

Letters Patent No. 97,555, dated December 7, 1869.

IMPROVED COMPOUND FOR DESTROYING INSECTS.

The Schedule referred to in these Letters Patent and making part of the same.

*To all whom it may concern:*

Be it known that we, N. T. P. ROBERTSON and THOMAS NILES, of Fairbury, in the county of Livingston, in the State of Illinois, have invented an Insect-Destroying and Tree-Invigorating Compound, for increasing the growth of fruit and ornamental trees, and destroying borers, caterpillars, canker-worms, tree-lice, and all insects and vermin that infest the bark, roots, or buds of the same.

*Application.*

For cortical use, as a paint on the bark, and hypo-cortical, by incision, and deposit, under the bark, without materially changing the color of the tree.

The above-named compound is composed of the following-named articles, in proportions as described in the following specifications.

*Description.*

Four and one-half drachms submuriate of mercury;
One drachm burnt umber;
One drachm red lead;
Two and one-half scruples chrome-yellow;
Ten grains Prussian blue; and
Four fluid ounces raw linseed-oil.

Having thus fully described our invention,
What we claim as new, and desire to secure by Letters Patent, is—

A compound, composed of the above-named articles, in or about the proportions specified, and used for the purposes herein set forth and described.

N. T. P. ROBERTSON.
THOMAS NILES.

Witnesses:
JOHN RICE,
WILLIAM CARPENTER.